(12) United States Patent
Shim et al.

(10) Patent No.: US 8,517,885 B2
(45) Date of Patent: Aug. 27, 2013

(54) TRANSMISSION FOR VEHICLE

(75) Inventors: Hyu Tae Shim, Hwaseong-si (KR); Kang Soo Seo, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 13/316,548

(22) Filed: Dec. 11, 2011

(65) Prior Publication Data
US 2013/0072342 A1    Mar. 21, 2013

(30) Foreign Application Priority Data
Sep. 21, 2011 (KR) .................. 10-2011-0095033

(51) Int. Cl.
*F16H 3/62* (2006.01)
(52) U.S. Cl.
USPC .......................................... 475/276; 475/278

(58) Field of Classification Search
None
See application file for complete search history.

(56) References Cited

U.S. PATENT DOCUMENTS
7,614,975 B2 * 11/2009 Seo ................................ 475/278

FOREIGN PATENT DOCUMENTS
KR    10-2010-0097706 A    9/2010

* cited by examiner

*Primary Examiner* — Erin D Bishop
(74) *Attorney, Agent, or Firm* — Morgan, Lewis & Bockius LLP

(57) ABSTRACT

A transmission for a vehicle employs four planetary gear trains to realizing at least forward 10-speed and reverse 3-speed gear ratios, thereby reducing the number of rotations of a second sun gear of a second planetary gear train so as to increase the efficiency of power transmission and to improve the longevity of related components of the second planetary gear train, such as a pinion gear, a pinion shaft, and a needle roller bearing.

9 Claims, 4 Drawing Sheets

|  | CL1 | CL2 | CL3 | B1 | B2 | B3 | B4 | F1 |
|---|---|---|---|---|---|---|---|---|
| 1st | ● |  |  | ● |  |  | ● | ○ |
| 2nd | ● |  |  |  | ● |  | ● |  |
| 3rd | ● | ● |  |  |  |  | ● |  |
| 4th |  | ● |  |  | ● |  | ● |  |
| 5th |  |  | ● |  | ● |  | ● |  |
| 6th |  | ● | ● |  | ● |  |  |  |
| 7th | ● | ● | ● |  |  |  |  |  |
| 8th | ● |  | ● |  | ● |  |  |  |
| 9th | ● |  | ● | ● |  |  |  |  |
| 10th |  |  | ● | ● | ● |  |  |  |
| Rev1 | ● |  |  | ● |  | ● |  |  |
| Rev2 | ● |  |  |  | ● | ● |  |  |
| Rev3 | ● | ● |  |  |  | ● |  |  |

|      | CL1 | CL2 | CL3 | B1 | B2 | B3 | B4 | F1 |
|------|-----|-----|-----|----|----|----|----|----|
| 1st  | ●   |     |     | ●  |    | ●  |    | ○  |
| 2nd  | ●   |     |     |    | ●  | ●  |    |    |
| 3rd  | ●   | ●   |     |    |    | ●  |    |    |
| 4th  |     | ●   |     |    | ●  | ●  |    |    |
| 5th  |     | ●   | ●   |    |    | ●  |    |    |
| 6th  |     | ●   | ●   |    | ●  |    |    |    |
| 7th  | ●   | ●   | ●   |    |    |    |    |    |
| 8th  | ●   |     |     |    | ●  |    |    |    |
| 9th  | ●   |     | ●   | ●  |    |    |    |    |
| 10th |     |     | ●   | ●  | ●  |    |    |    |
| Rev1 | ●   |     |     | ●  |    |    | ●  |    |
| Rev2 | ●   |     |     |    | ●  |    | ●  |    |
| Rev3 | ●   | ●   |     |    |    |    | ●  |    |
| Rev4 |     | ●   |     |    | ●  |    | ●  |    |

TRANSMISSION FOR VEHICLE

CROSS-REFERENCE TO RELATED APPLICATION

The present application claims priority of Korean Patent Application Number 10-2011-0095033 filed Sep. 21, 2011, the entire contents of which application is incorporated herein for all purposes by this reference.

BACKGROUND OF INVENTION

1. Field of Invention

The present invention relates, in general, to a transmission for a vehicle, and, more particularly, to a structure of a transmission for a vehicle, capable of realizing forward 10-speed and reverse 4-speed gear ratios.

2. Description of Related Art

FIG. 1 shows a structure of a conventional forward 10-speed and reverse 3-speed transmission. The transmission is made up of a first compound planetary gear train CG1 having a first planetary gear train PG1 and a second planetary gear train PG2, and a second compound planetary gear train CG2 having a third planetary gear train PG3 and a fourth planetary gear train PG4. The first planetary gear train PG1 is made up of a first sun gear S1, a first carrier C1, and a first ring gear R1. The second planetary gear train PG2 is made up of a second sun gear S2, a second carrier C2, and a second ring gear R2. The third planetary gear train PG3 is made up of a third sun gear S3, a third carrier C3, and a third ring gear R3. The fourth planetary gear train PG4 is made up of a four sun gear S4, a four carrier C4, and a fourth ring gear R4. The first ring gear R1 and the second carrier C2 are permanently connected to each other, and are integrally connected to the third sun gear S3.

Further, the transmission is equipped with: a first clutch CL1, a second clutch CL2, and a third clutch CL3; a first brake B1, a second brake B2, a third brake B3, and fourth brake B4; and one one-way clutch F1. An input shaft IN is input by means of first to third clutches CL1 to CL3, and an output shaft OUT is connected to the third ring gear R3 and the fourth carrier C4.

The conventional 10-speed transmission as mentioned above realizes forward 10-speed and reverse 3-speed gear ratios by means of a combination of components as shown in FIG. 2, and a lever diagram thereof is shown in FIG. 3.

In the conventional transmission configured as mentioned above, the rotational speed of the second sun gear S2 is frequently excessive. As a result, the efficiency of power transmission is reduced, and the durability of related components of the second planetary gear train PG2 such as a pinion gear, a pinion shaft, and a needle roller bearing, is reduced.

That is, referring to FIGS. 2 and 3, in the 4-speed and 6-speed gear ratios in which the second clutch CL2 and the second brake B2 are operated at the same time, the rotational speed of the second gear S2 is excessively high.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Accordingly, the present invention has been made keeping in mind the above problems occurring in the related art, and proposes a transmission for a vehicle, which employs four planetary gear trains to realize at least forward 10-speed and reverse 3-speed gear ratios, thereby reducing the number of rotations of a second sun gear of a second planetary gear train so as to increase the efficiency of power transmission and to improve the longevity of related components of the second planetary gear train, such as a pinion gear, a pinion shaft, and a needle roller bearing.

Various aspects of the present invention provide for a transmission for a vehicle, which includes: a first compound planetary gear train in which a first planetary gear train and a second planetary gear train are connected to each other; a second compound planetary gear train which is connected with the first compound planetary gear train and in which a third planetary gear train and a fourth planetary gear train are connected to each other; an input shaft which is connected to the first compound planetary gear train; an output shaft which is connected to the second compound planetary gear train; a first clutch which selectively connects a third rotational element of the first planetary gear train and a second rotational element of the second planetary gear train to each other; a second clutch which selectively connects the input shaft to a second rotational element of the first planetary gear train and a third rotational element of the second planetary gear train; a third clutch which selectively connects the input shaft to a third rotational element of the third planetary gear train; a first brake B1 which selectively locks the second rotational element of the first planetary gear train and the third rotational element of the second planetary gear train; a second brake which selectively locks a first rotational element of the first planetary gear train; a third brake which selectively locks a first rotational element of the third planetary gear train along with a first rotational element of the fourth planetary gear train; and a fourth brake which selectively locks the third rotational element of the third planetary gear train along with a second rotational element of the fourth planetary gear train.

According to the present invention, the transmission employs four planetary gear trains to realize at least forward 10-speed and reverse 3-speed gear ratios, thereby reducing the number of rotations of a second sun gear of a second planetary gear train so as to increase the efficiency of power transmission and to improve the longevity of related components of the second planetary gear train, such as the pinion gear, pinion shaft, and needle roller bearing.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION OF THE INVENTION

Figures 1, 2:
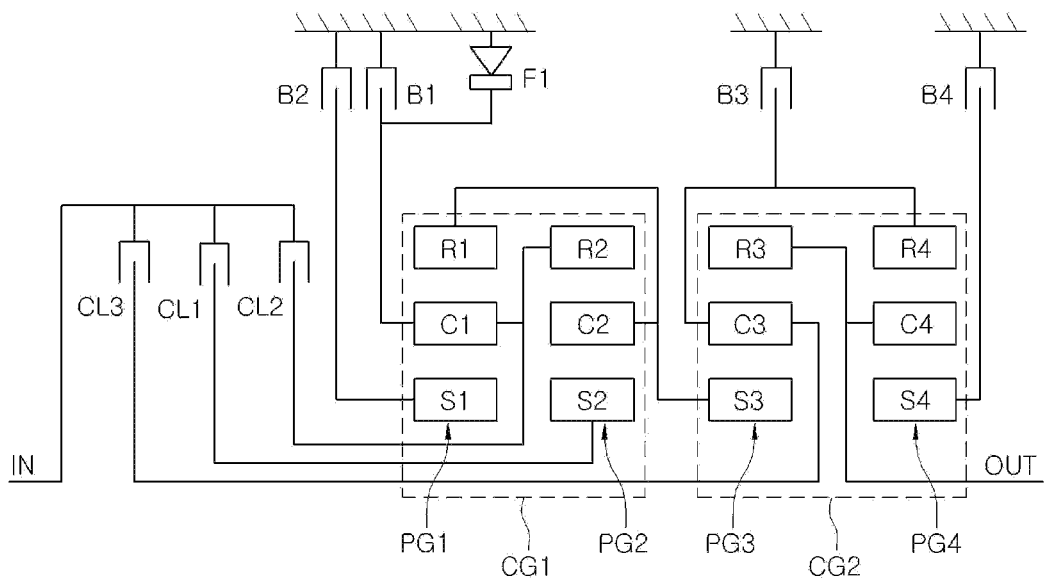
FIG. 1 shows configuration of a conventional transmission for a vehicle.
FIG. 2 shows an operation chart of operating elements of the transmission of FIG. 1.
Figure 3:
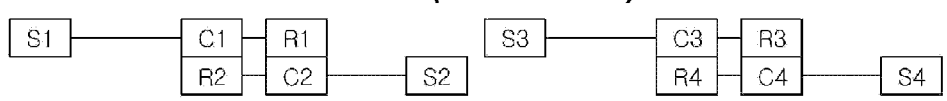
FIG. 3 is a lever diagram explaining operation of the transmission of FIG. 1.
Figure 3:
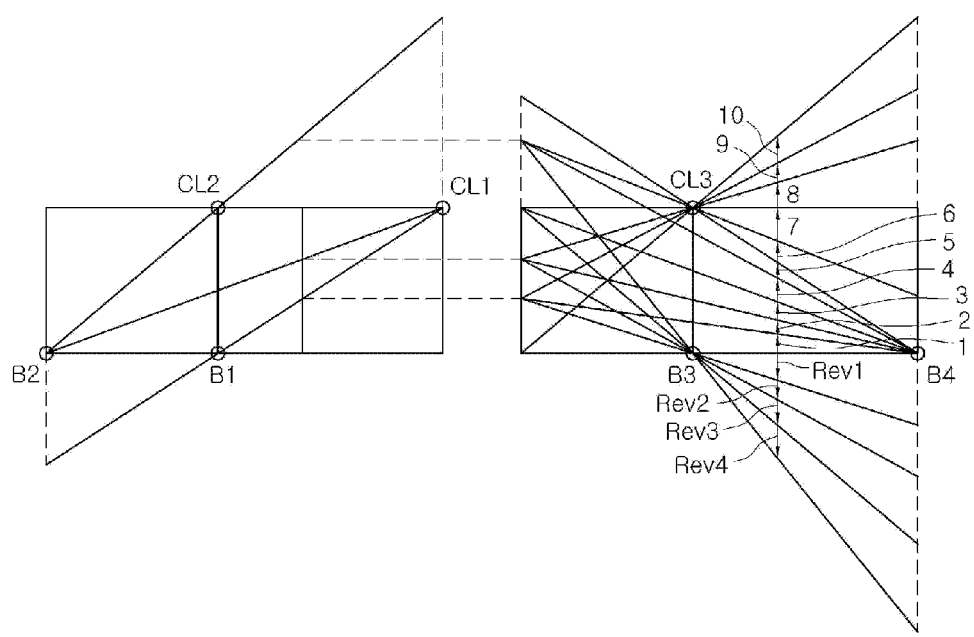

Reference will now be made in detail to various embodiments of the present invention(s), examples of which are illustrated in the accompanying drawings and described below. Wherever possible, the same reference numerals will be used throughout the drawings and the description to refer to the same or like parts. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figures 4, 5:
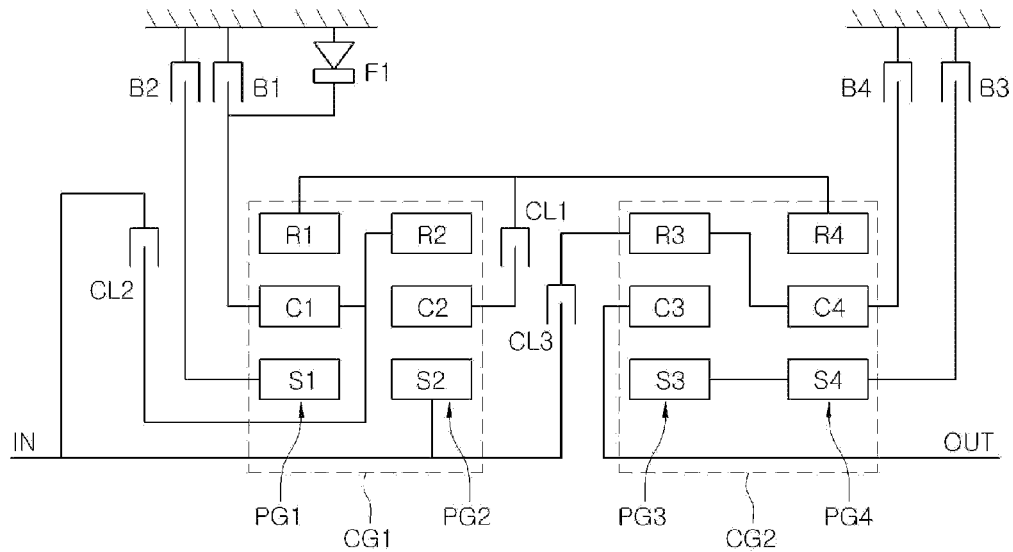
FIG. 4 shows configuration of an exemplary transmission for a vehicle according to the present invention.
FIG. 5 shows an operation chart of operating elements of the transmission of FIG. 4.
Figure 6:
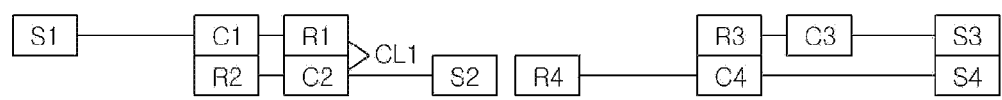
FIG. 6 is a lever diagram explaining operation of the transmission of FIG. 4.
Figure 6:
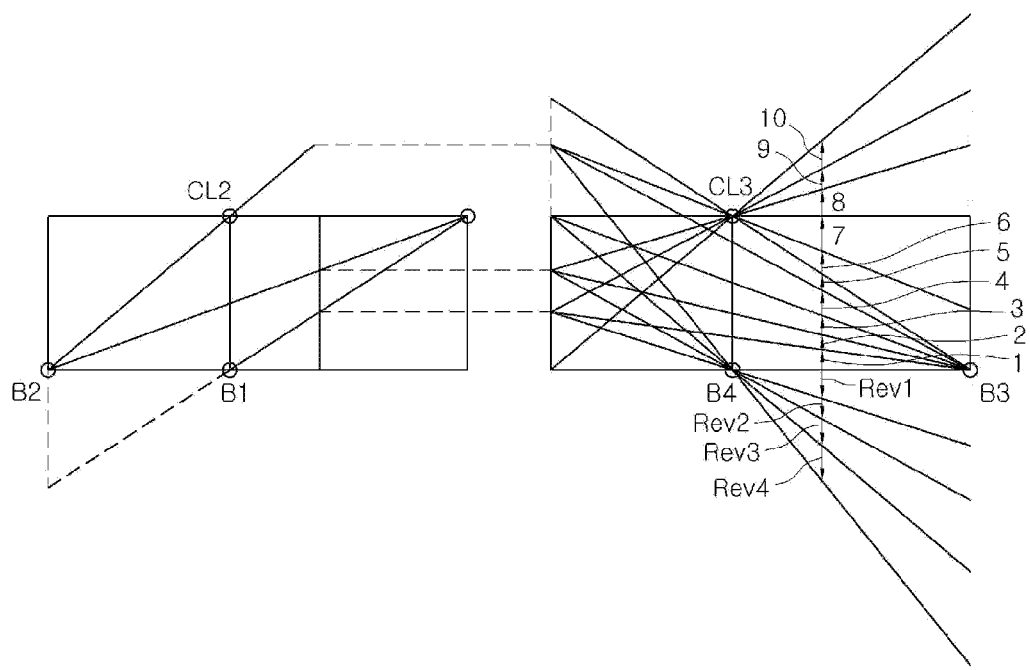

Referring to FIGS. 4 to 6, a transmission for a vehicle according to various embodiments of the present invention includes: a first compound planetary gear train CG1 in which a first planetary gear train PG1 and a second planetary gear train PG2 are connected to each other; a second compound planetary gear train CG2 which is connected with the first compound planetary gear train CG1 and in which a third planetary gear train PG3 and a fourth planetary gear train PG4 are connected to each other; an input shaft IN which is connected to the first compound planetary gear train CG1; an output shaft OUT which is connected to the second compound planetary gear train CG2; a first clutch CL1 which selectively connects a third rotational element of the first planetary gear train PG1 and a second rotational element of the second planetary gear train PG2 to each other; a second clutch CL2 which selectively connects the input shaft IN to a second rotational element of the first planetary gear train. PG1 and a third rotational element of the second planetary gear train PG2; a third clutch CL3 which selectively connects the input shaft IN to a third rotational element of the third planetary gear train PG3; a first brake B1 which selectively locks the second rotational element of the first planetary gear train PG1 and the third rotational element of the second planetary gear train PG2; a second brake B2 which selectively locks a first rotational element of the first planetary gear train PG1; a third brake B3 which selectively locks a first rotational element of the third planetary gear train PG3 along with a first rotational element of the fourth planetary gear train PG4; and a fourth brake B4 which selectively locks the third rotational element of the third planetary gear train PG3 along with a second rotational element of the fourth planetary gear train PG4.

The input shaft IN is permanently connected to a first rotational element of the second planetary gear train PG2. A third rotational element of the first planetary gear train PG1 is permanently connected to a third rotational element of the fourth planetary gear train PG4. Further, the output shaft OUT is connected to a second rotational element of the third planetary gear train PG3.

The first compound planetary gear train CG1 is configured to permanently connect the second rotational element of the first planetary gear train PG1 and the third rotational element of the second planetary gear train PG2 and to selectively connect the third rotational element of the first planetary gear train PG1 and the second rotational element of the second planetary gear train PG2 using the first clutch CL1.

The second compound planetary gear train CG2 is configured to permanently connect the first rotational element of the third planetary gear train PG3 and the first rotational element of the fourth planetary gear train PG4 and to permanently connect the third rotational element of the third planetary gear train PG3 and the second rotational element of the fourth planetary gear train PG4.

Herein, the first, second, and third rotational elements of the first planetary gear train PG1 are sequentially referred to as a first sun gear S1, a first carrier C1, and a first ring gear R1. The first, second, and third rotational elements of the second planetary gear train PG2 are sequentially referred to as a second sun gear S2, a second carrier C2, and a second ring gear R2. The first, second, and third rotational elements of the third planetary gear train PG3 are sequentially referred to as a third sun gear S3, a third carrier C3, and a third ring gear R3. The first, second, and third rotational elements of the fourth planetary gear train PG4 are sequentially referred to as a fourth sun gear S4, a fourth carrier C4, and a fourth ring gear R4.

Thus, in the first compound planetary gear train CG1, the first carrier C1 is permanently connected to the second ring gear R2, and the first ring gear R1 is selectively connected to the second carrier C2 via the first clutch CL1. When the selective connection is made by the first clutch CL1, the first compound planetary gear train CG1 is configured as a CR-CR type compound planetary gear train.

Further, in the second compound planetary gear train CG2, the third sun gear S3 is permanently connected to a fourth sun gear S4, and the third ring gear R3 is permanently connected to the fourth carrier C4. Thereby, the second compound planetary gear train CG2 is configured as a Simpson type compound planetary gear train, in which the fourth ring gear R4 is permanently connected to the first ring gear R1.

Further, the input shaft IN is selectively connected to a connector between the first carrier C1 and the first ring gear R1 via the second clutch CL2, is permanently connected to the second sun gear S2, and is selectively connected to a connector between the third ring gear R3 and the fourth carrier C4 via the third clutch CL3. The output shaft OUT is connected to the third carrier C3.

The first brake B1 is installed so as to be able to selectively lock the connector between the first carrier C1 and the second ring gear R2. The second brake B2 is installed so as to be able to selectively lock the first sun gear S1. The third brake B3 is installed so as to be able to selectively lock a connector between the third sung gear S3 and the fourth sun gear S4. The fourth brake B4 is installed so as to be able to selectively lock a connector between the third ring gear R3 and the fourth carrier C4.

Further, to prevent the connector between the first carrier C1 and the second ring gear R2 from rotating in reverse, a one-way clutch F1 is provided.

With the aforementioned configuration, the transmission for a vehicle according to various embodiments of the present invention has gear ratios on the basis of the operational chart of FIG. 5, and this operation can be arranged as in the lever diagram of FIG. 6.

In particular, the inventive transmission is designed to permanently connect the second sun gear S2 of the second planetary gear train PG2 to the input shaft IN, and to variably connect the first ring gear R1 of the first planetary gear train PG1 and the second carrier C2 of the second planetary gear train PG2 using the first clutch CL1, thereby reducing the number of rotations of the second sun gear S2 so as to increase the efficiency of power transmission and to improve the durability of a pinion gear, a pinion shaft, and a needle roller bearing of the second planetary gear train PG2.

That is, the second sun gear S2 is connected to the input shaft IN, so that the second sun gear S2 does not rotate above a rotation speed of the input shaft IN, and the first clutch CL1 is released in 4-speed, 6-speed, and reverse 4-speed gear ratios where the second clutch CL2 is operated along with the second brake B2, so that the rotational speed of the second sun gear S2 maintains that of the input shaft IN without exceeding that of the input shaft IN.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A transmission for a vehicle comprising:
   a first compound planetary gear train in which a first planetary gear train and a second planetary gear train are connected to each other;
   a second compound planetary gear train which is connected with the first compound planetary gear train and in which a third planetary gear train and a fourth planetary gear train are connected to each other;
   an input shaft which is connected to the first compound planetary gear train;
   an output shaft which is connected to the second compound planetary gear train;
   a first clutch which selectively and directly connects a third rotational element of the first planetary gear train and a second rotational element of the second planetary gear train to each other;
   a second clutch which selectively connects the input shaft to a second rotational element of the first planetary gear train and a third rotational element of the second planetary gear train;
   a third clutch which selectively connects the input shaft to a third rotational element of the third planetary gear train;
   a first brake which selectively locks the second rotational element of the first planetary gear train and the third rotational element of the second planetary gear train;
   a second brake which selectively and directly locks a first rotational element of the first planetary gear train wherein the second brake is directly connected to the first rotational element of the first planetary gear train;
   a third brake which selectively locks a first rotational element of the third planetary gear train along with a first rotational element of the fourth planetary gear train; and
   a fourth brake which selectively locks the third rotational element of the third planetary gear train along with a second rotational element of the fourth planetary gear train.

2. The transmission according to claim 1, wherein:
   the input shaft is permanently connected to a first rotational element of the second planetary gear train;
   the third rotational element of the first planetary gear train is permanently connected to a third rotational element of the fourth planetary gear train; and
   the output shaft is connected to a second rotational element of the third planetary gear train.

3. The transmission according to claim 1, wherein the first compound planetary gear train is configured so that the second rotational element of the first planetary gear train and the third rotational element of the second planetary gear train are permanently connected to each other, and the third rotational element of the first planetary gear train and the second rotational element of the second planetary gear train are selectively connected to each other via the first clutch.

4. The transmission according to claim 1, wherein the second compound planetary gear train is configured so that the first rotational element of the third planetary gear train and the first rotational element of the fourth planetary gear train are permanently connected to each other, and the third rotational element of the third planetary gear train and the second rotational element of the fourth planetary gear train are permanently connected to each other.

5. The transmission according to claim 1, wherein:
   the first, second, and third rotational elements of the first planetary gear train sequentially correspond to a first sun gear, a first carrier, and a first ring gear;
   a first rotational element of the second planetary gear train and the second and third rotational elements of the second planetary gear train sequentially correspond to a second sun gear, a second carrier, and a second ring gear;
   the first and third rotational elements of the third planetary gear train and a second rotational element of the third planetary gear train sequentially correspond to a third sun gear, a third ring gear, and a third carrier;
   the first and second rotational elements of the fourth planetary gear train and a third rotational element of the fourth planetary gear train sequentially correspond to a fourth sun gear, a fourth carrier, and a fourth ring gear;
   the first compound planetary gear train is configured as a CR-CR type compound planetary gear train wherein the first carrier is permanently connected to the second ring gear and wherein the first ring gear is selectively connected to the second carrier via the first clutch.

6. The transmission according to claim 5, wherein:
   the second compound planetary gear train is configured as a Simpson type compound planetary gear train wherein the third sun gear is permanently connected to the fourth sun gear and wherein the third ring gear is permanently connected to the fourth carrier; and
   the fourth ring gear is permanently connected to the first ring gear.

7. The transmission according to claim 6, wherein:
   the input shaft is selectively connected to a connector between the first carrier and the second ring gear via the second clutch, is permanently connected to the second sun gear, and is selectively connected to a connector between the third ring gear and the fourth carrier via the third clutch; and
   the output shaft is connected to the third carrier.

8. The transmission according to claim 7, wherein:
   the first brake is installed so as to be able to selectively lock the connector between the first carrier and the second ring gear;
   the second brake is installed so as to be able to selectively lock the first sun gear;
   the third brake is installed so as to be able to selectively lock a connector between the third sun gear and the fourth sun gear; and
   the fourth brake is installed so as to be able to selectively lock the connector between the third ring gear and the fourth carrier.

9. The transmission according to claim 8, further comprising a one-way clutch that prevents the connector between the first carrier and the second ring gear from rotating in reverse.

* * * * *